United States Patent
Liu et al.

(10) Patent No.: US 11,990,843 B2
(45) Date of Patent: *May 21, 2024

(54) METHODS AND CIRCUITS FOR SENSING ISOLATED POWER CONVERTER OUTPUT VOLTAGE ACROSS THE ISOLATION BARRIER

(71) Applicant: Queen's University at Kingston, Kingston (CA)

(72) Inventors: Yan-Fei Liu, Kingston (CA); Yang Chen, Hefei (CN); Binghui He, Kingston (CA); Wenbo Liu, Meihekou (CN); Bo Sheng, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,325

(22) Filed: Jul. 24, 2023

(65) Prior Publication Data

US 2024/0097573 A1   Mar. 21, 2024

Related U.S. Application Data

(63) Continuation of application No. 17/742,846, filed on May 12, 2022, now Pat. No. 11,711,023.

(60) Provisional application No. 63/188,752, filed on May 14, 2021.

(51) Int. Cl.
*H02M 3/335* (2006.01)
*H02M 1/00* (2006.01)
*H02M 3/00* (2006.01)

(52) U.S. Cl.
CPC ..... *H02M 3/33576* (2013.01); *H02M 1/0003* (2021.05); *H02M 3/01* (2021.05); *H02M 3/33515* (2013.01); *H02M 3/3353* (2013.01); *H02M 3/33573* (2021.05); *H02M 3/33553* (2013.01)

(58) Field of Classification Search
CPC .. H02M 3/33576; H02M 1/0003; H02M 3/01; H02M 3/33515; H02M 3/3353; H02M 3/33573; H02M 3/33553; Y02B 70/10
See application file for complete search history.

(56) References Cited

U.S. PATENT DOCUMENTS

| | | | | |
|---|---|---|---|---|
| 5,764,495 A | * | 6/1998 | Faulk | H02M 3/33576 363/21.13 |
| 6,088,244 A | * | 7/2000 | Shioya | H02M 3/33523 323/902 |
| 10,193,457 B1 | * | 1/2019 | Hande | H02M 1/36 |
| 10,693,384 B1 | * | 6/2020 | Mondal | H02M 3/33592 |

(Continued)

*Primary Examiner* — Yusef A Ahmed
(74) *Attorney, Agent, or Firm* — Stephen J. Scribner

(57) ABSTRACT

A control circuit for an isolated power converter includes a first sensing circuit that senses a secondary side output voltage and produces a pulse width modulation (PWM) signal having a duty cycle that is proportional to a value of the secondary side output voltage. The PWM is transferred a cross the converter isolation barrier to the primary side, and a primary side circuit receives the PWM signal and outputs a control signal. A controller determines the value of the secondary side output voltage from the control signal and uses the value to control primary side power switching devices of the isolated power converter to regulate the secondary side output voltage at a selected value.

13 Claims, 10 Drawing Sheets

(56) References Cited

U.S. PATENT DOCUMENTS

| | | | |
|---|---|---|---|
| 10,756,644 B1* | 8/2020 | Shah | H02M 3/07 |
| 10,862,399 B1* | 12/2020 | Rai | H02M 3/33515 |
| 10,910,952 B1* | 2/2021 | Furukoshi | H02M 3/33573 |
| 10,931,204 B1* | 2/2021 | Han | H02M 3/33507 |
| 10,944,330 B1* | 3/2021 | Lee | H03K 17/3576 |
| 11,018,595 B1* | 5/2021 | Kuchipudi | H02M 3/33523 |
| 11,038,430 B2* | 6/2021 | Brennan | H02M 3/33573 |
| 2008/0192509 A1* | 8/2008 | Dhuyvetter | H02M 3/33523 363/16 |
| 2008/0259655 A1* | 10/2008 | Wei | H03K 3/017 327/175 |
| 2010/0254443 A1* | 10/2010 | Scharrer | H02M 3/33515 375/220 |
| 2012/0099345 A1* | 4/2012 | Zhao | H02M 3/33592 363/21.05 |
| 2013/0009491 A1* | 1/2013 | Hafner | H03K 17/785 307/113 |
| 2013/0264961 A1* | 10/2013 | Chang | H04B 10/802 315/201 |
| 2014/0192565 A1* | 7/2014 | Wang | H02M 3/33592 363/21.14 |
| 2014/0192566 A1* | 7/2014 | Yang | H02M 3/33523 363/21.15 |
| 2014/0195065 A1* | 7/2014 | Yang | H02M 3/33523 700/298 |
| 2014/0198535 A1* | 7/2014 | Yang | H02M 3/33523 363/16 |
| 2014/0268917 A1* | 9/2014 | Ma | H02M 3/33523 330/188 |
| 2014/0313784 A1* | 10/2014 | Strzalkowski | H02M 3/33584 363/17 |
| 2015/0023066 A1* | 1/2015 | Kawashima | H02M 3/33546 363/21.02 |
| 2015/0326127 A1* | 11/2015 | Peng | H05B 45/382 363/21.01 |
| 2016/0149504 A1* | 5/2016 | Quigley | H02M 3/33523 363/21.04 |
| 2016/0352231 A1* | 12/2016 | Quigley | H02M 3/33592 |
| 2016/0352237 A1* | 12/2016 | Quigley | H02M 1/08 |
| 2016/0359421 A1* | 12/2016 | Lin | H02M 1/08 |
| 2016/0365794 A1* | 12/2016 | Lawson | H02J 3/32 |
| 2017/0054376 A1* | 2/2017 | Quigley | H02M 3/33507 |
| 2018/0248472 A1* | 8/2018 | Qiu | H02M 1/143 |
| 2020/0007043 A1* | 1/2020 | Miao | H02M 3/01 |
| 2020/0112244 A1* | 4/2020 | Chen | H02M 1/143 |
| 2020/0287454 A1* | 9/2020 | Lee | G06F 13/4282 |
| 2021/0091675 A1* | 3/2021 | Rajesh | H02M 3/33507 |
| 2021/0194376 A1* | 6/2021 | Lee | H02M 1/32 |
| 2022/0166327 A1* | 5/2022 | Liu | H02M 1/0025 |
| 2022/0200476 A1* | 6/2022 | Ahmed | H02J 7/0042 |

\* cited by examiner

METHODS AND CIRCUITS FOR SENSING ISOLATED POWER CONVERTER OUTPUT VOLTAGE ACROSS THE ISOLATION BARRIER

RELATED APPLICATION

This application is a continuation of application Ser. No. 17/742,846, filed on May 12, 2022, now U.S. Pat. No. 11,711,023, and claims the benefit of the filing date of Application No. 63/188,752, filed on May 14, 2021, the contents of which are incorporated herein by reference in their entirety.

FIELD

This invention relates to isolated power converters. More specifically, the invention relates to methods and circuits for accurate sensing of the output voltage of isolated power converters and transferring the sensed output voltage across the converter isolation barrier to achieve accurate output voltage regulation with fast response time.

BACKGROUND

Isolated power converters are used extensively in applications such as battery chargers, data center power supplies, chargers for devices such as cell phones, tablets, and laptop computers, etc. An example of an isolated DC-DC converter according to the prior art is shown in FIG. 1. Referring to FIG. 1, in an isolated converter the primary (input) side is isolated from the secondary (output) side, which may be achieved by a transformer T. Regulation of the output voltage Vo is achieved by a digital controller such as a micro-controller unit MCU2. To achieve voltage regulation, a feedback signal such as an error voltage based on the output voltage Vo is used as an input to the controller MCU2. Because of the need to maintain electrical isolation between the input side and the output side, an optocoupler OPT1 is typically used to transfer the error voltage Verror 1 on the secondary side to an error voltage Verror2 on the primary side, as input to the controller MCU2. However, a limitation of current approaches is that the error voltage Verror2 is not directly proportional to Vo, and as a result precise output voltage information cannot be obtained at the primary side.

SUMMARY

One aspect of the invention relates to a control circuit for an isolated power converter, comprising: a first sensing circuit that senses a secondary side output voltage of the isolated power converter and produces a pulse width modulation (PWM) signal having a duty cycle that is proportional to a value of the secondary side output voltage; a first isolator that transfers the PWM signal across an isolation barrier to a primary side of the isolated power converter; a first primary side circuit that receives the PWM signal from the first isolator and outputs a control signal; and a first microcontroller that determines the value of the secondary side output voltage from the control signal and controls primary side power switching devices of the isolated power converter to regulate the secondary side output voltage at a selected value.

In one embodiment the first primary side circuit comprises a filter that filters the PWM signal from the first isolator; wherein the control signal comprises the filtered PWM signal having a voltage value proportional to the value of the secondary side output voltage.

In one embodiment the first sensing circuit comprises a comparator that produces the PWM signal.

In one embodiment the first sensing circuit comprises a second microcontroller that produces the PWM signal.

In one embodiment the control circuit includes a feedback circuit comprising: a second sensing circuit that senses the secondary side output voltage of the isolated power converter and uses the sensed secondary side output voltage and a reference voltage to produce an error voltage; a second isolator that transfers the error voltage across the isolation barrier to the primary side of the isolated power converter; wherein a steady state output voltage is determined using the reference voltage; wherein the first microcontroller calculates a steady state gain using the steady state output voltage and a steady state value of the control signal, and uses the steady state gain to calibrate an actual gain of the first sensing circuit to the determine an actual secondary side output voltage; wherein the first microcontroller controls the primary side power switching devices of the isolated power converter to regulate the secondary side output voltage at the selected value.

In one embodiment the second sensing circuit comprises an error amplifier that produces the error voltage.

In one embodiment the first primary side circuit comprises a sampling circuit including a capacitor that is charged and discharged according to a duty cycle of the PWM signal received from the first isolator; wherein the first microcontroller samples a voltage across the capacitor at a sampling time set by a period of the PWM signal received from the first isolator; wherein the control signal comprises the sampled voltage across the capacitor.

In one embodiment the first isolator outputs the PWM signal to the first microcontroller; wherein the first microcontroller measures a logic high time interval (T_high) of the PWM signal and uses the T_high interval to control the primary side power switching devices of the isolated power converter to regulate the secondary side output voltage at the selected value.

In one embodiment the first primary side circuit comprises a switch that shapes the PWM signal received from the first isolator by reducing a falling time and rising time of the PWM signal.

In one embodiment the first sensing circuit comprises a second microcontroller that produces the PWM signal and a PWM error signal from the output voltage; wherein the first isolator transfers the PWM signal across the isolation barrier; wherein a second isolator transfers the PWM error signal across the isolation barrier; wherein the first primary side circuit filters the PWM signal and outputs a first control signal; wherein a second primary side circuit comprising a filter filters the PWM error signal and outputs a second control signal; wherein the first microcontroller uses the first control signal and the second control signal to control the primary side power switching devices of the isolated power converter to regulate the secondary side output voltage at a selected value.

Another aspect of the invention relates to a method for controlling an isolated power converter, comprising sensing a secondary side output voltage of the isolated power converter using a first sensing circuit that produces a pulse width modulation (PWM) signal having a duty cycle that is proportional to a value of the secondary side output voltage; using a first isolator to transfer the PWM signal across an isolation barrier to a primary side of the isolated power converter; using the PWM signal received from the first isolator at the primary side to produce a control signal; and using a first microcontroller to determine the value of the secondary side output voltage from the control signal and using the value of the secondary side output voltage to control primary side power switching devices of the isolated power converter to regulate the secondary side output voltage at a selected value.

In one embodiment the control signal is produced using a first primary side circuit comprising a filter that filters the PWM signal from the first isolator; wherein the control signal comprises the filtered PWM signal having a voltage value proportional to the value of the secondary side output voltage.

In one embodiment the secondary side output voltage is sensed using a first sensing circuit comprising a comparator that produces the PWM signal.

In one embodiment the secondary side output voltage is sensed using a first sensing circuit comprising second microcontroller that produces the PWM signal.

In one embodiment the method comprises using a second sensing circuit that senses the secondary side output voltage of the isolated power converter and uses the sensed secondary side output voltage and a reference voltage to produce an error voltage; using a second isolator to transfer the error voltage across the isolation barrier to the primary side of the isolated power converter; wherein a steady state output voltage is determined using the reference voltage; wherein the first microcontroller calculates a steady state gain using the steady state output voltage and a steady state value of the control signal, and uses the steady state gain to calibrate an actual gain of the first sensing circuit to the determine an actual secondary side output voltage; wherein the first microcontroller controls the primary side power switching devices of the isolated power converter to regulate the secondary side output voltage at the selected value.

In one embodiment the second sensing circuit comprises an error amplifier that produces the error voltage.

In one embodiment the first primary side circuit comprises a sampling circuit including a capacitor that is charged and discharged according to a duty cycle of the PWM signal received from the first isolator; wherein the first microcontroller samples a voltage across the capacitor at a sampling time set by a period of the PWM signal received from the first isolator; wherein the control signal comprises the sampled voltage across the capacitor.

In one embodiment the first isolator outputs the PWM signal to the first microcontroller; wherein the first microcontroller measures a logic high time interval (T_high) of the PWM signal and uses the T_high interval to control the primary side power switching devices of the isolated power converter to regulate the secondary side output voltage at the selected value.

In one embodiment the method comprises shaping the PWM signal received from the first isolator at the primary side by reducing a falling time and rising time of the PWM signal.

In one embodiment the first sensing circuit comprises a second microcontroller that produces the PWM signal and a PWM error signal from the output voltage; wherein the first isolator transfers the PWM signal across the isolation barrier; wherein a second isolator transfers the PWM error signal across the isolation barrier; wherein the first primary side circuit filters the PWM signal and outputs a first control signal; wherein a second primary side circuit comprising a filter filters the PWM error signal and outputs a second control signal; wherein the first microcontroller uses the first control signal and the second control signal to control the primary side power switching devices of the isolated power converter to regulate the secondary side output voltage at a selected value.

Another aspect of the invention relates to an isolated power converter comprising a control circuit as described herein.

In one embodiment, the converter output voltage is converted into a PWM signal with which the duty cycle of the PWM signal is proportional to the output voltage, the PWM signal is transferred from one side of the isolation barrier to the other side of the isolation barrier and the duty cycle is maintained same, and the DC value of the PWM signal is retrieved by a low pass filter.

In one embodiment, an error amplifier feedback loop is used to regulate the converter output voltage to its steady state, and the output of the PWM Vo sensing circuit is calibrated by the error amplifier feedback loop to remove the tolerance in the analog PWM Vo sensing circuit.

In another embodiment, the converter output voltage is converted into a digital signal with which the time interval of logic high is proportional to the output voltage, the digital signal is transferred from one side of the isolation barrier to another side of the isolation barrier and the time interval of the logic high is maintained the same, and the time interval of the logic high signal is calculated (i.e., retrieved) by a digital controller.

BRIEF DESCRIPTION OF THE DRAWINGS

For a better understanding of the invention, and to show more clearly how it may be carried into effect, embodiments will be described below, by way of example, with reference to the accompanying drawings, wherein.

DETAILED DESCRIPTION OF EMBODIMENTS

Figure 1:
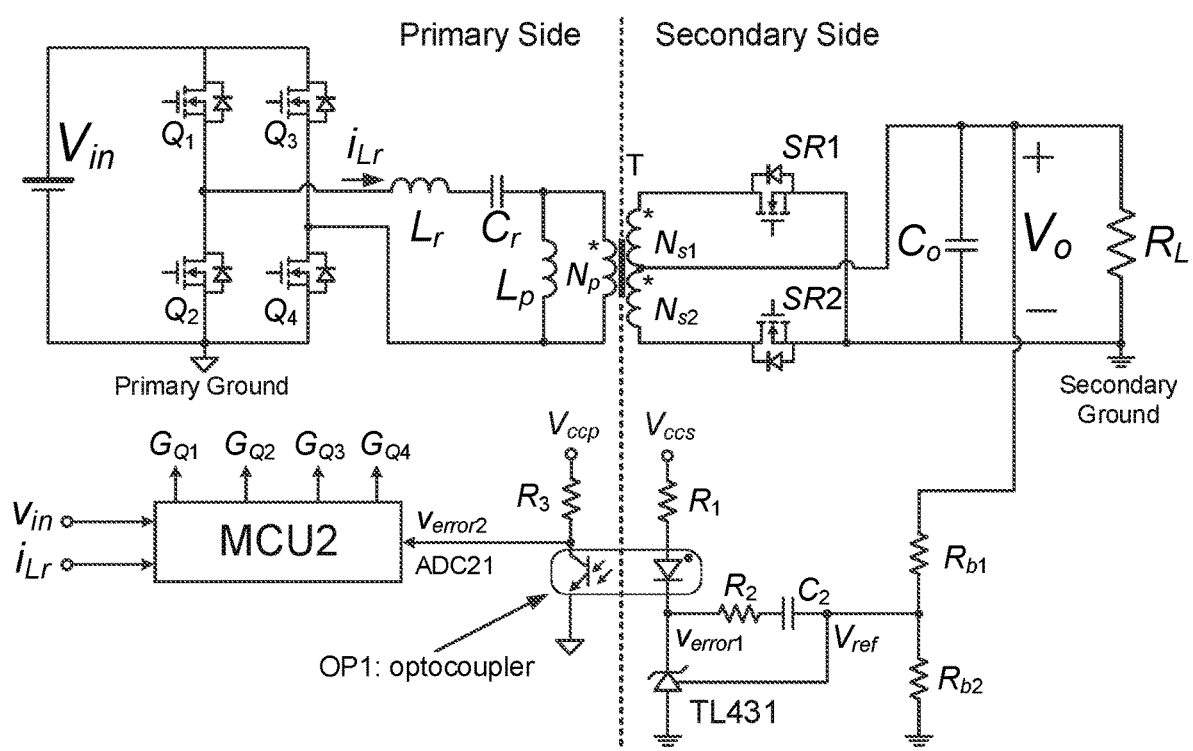
FIG. 1 is a schematic diagram of an isolated inductor-inductor-capacitor (LLC) converter operating as DC to DC converter with a controller at the primary side, according to the prior art.

FIG. 1 shows an isolated DC to DC converter with full bridge inductor-inductor-capacitor (LLC) converter as the power stage, according to the prior art. It is noted that a transformer T is used to achieve isolation between the primary side (shown on the left side of the dotted line) and the secondary side (shown on the right side of the dotted line). Np refers to the transformer primary winding and Ns1, Ns2 refer to transformer secondary windings.

MCU2 in FIG. 1 refers to a microcontroller unit. It is a digital controller that is used to control the operation of the LLC converter by providing switching signals ($G_{Q1}$-$G_{Q4}$) to the power switches $Q_1$-$Q_4$ of the power converter primary side. In this circuit, output voltage Vo regulation is achieved by transferring the value of error voltage Verror2 from the secondary side across the isolation barrier to primary side, for use by the digital controller MCU2.

In FIG. 1 MCU2 is placed at the primary side of the power supply. The output voltage Vo at the secondary side passes through a resistor divider circuit (Rb1, Rb2) connected to a voltage regulator TL431, which sets a reference voltage Vref and includes an OpAmp. The output of the TL431 (Verror1) changes and therefore, the current through the diode of the analog optocoupler OP1 changes. The output current of the analog optocoupler OP1 (i.e., the current through the bipolar junction transistor (BJT)) is proportional to its input current (i.e., the current through the diode), so that the error voltage at the primary side, Verror2, also changes. Verror2 is converted into digital value by an Analog to Digital Converter (ADC) in MCU2 through pin ADC21. The MCU2 processes the error information and generates a control signal, such as switching frequency of the LLC converter, through four gate drive signals $G_{Q1}$-$G_{Q4}$. In some cases, the resonant current and input voltage are also sensed and used by MCU2.

It is noted that Verror2 contains the error information of the output voltage. In the case shown in FIG. 1, Verror2 depends on the compensation network (R2, C2), the reference voltage Vref of TL431, the Current Transfer Ratio (CTR) of the analog optocoupler OP1, and values of resistors R1, R3, Rb1, and Rb2, as shown in equation (1)

$$Verror2 = f(Vref, R2, C2, CTR, Rb1, Rb2) \quad (1)$$

wherein f is typically a complex function.

However, according to the prior approach of FIG. 1, Verror2 is not directly proportional to Vo, as shown below:

$$Verror2 \neq kVo \quad (2)$$

In the above equation, ≠ means "not equal", and k is a constant.

Described herein are methods and apparatus, i.e., circuits, that overcome the limitations of prior approaches (such as that shown in FIG. 1) for transferring sensed analog voltages across the isolation barrier of isolated converters. Embodiments accurately sense and transfer a voltage from one side of the isolation barrier to the other side of the isolation barrier. For example, embodiments may sense the output voltage of an isolated power supply and transfer the sensed voltage from the secondary side, across the isolation barrier, to the primary side. Although embodiments may be used for any isolated converter application, they are particularly suitable for applications where precise output voltage information is required at the other side of the isolation barrier. According to embodiments, this may be achieved by transferring a signal that is directly proportional to the value of the output voltage from one side of the isolation barrier (secondary side) to the other side of isolation barrier (primary side), as shown below:

$$Vop = kVo \quad (3)$$

In the above equation, Vop is a DC signal that is the input to a primary side controller, Vo is the output voltage, and parameter "k" is a constant. Thus, Vop is directly proportional to the output voltage.

As used herein, the term "isolated converter" refers to an isolated AC to DC, DC to DC, DC to AC, or AC to AC converter. An isolated converter may be based on a design selected from, but not limited to, full bridge, flyback, inductor-inductor-capacitor (LLC), inductor-capacitor-capacitor (LCC), etc.

Figure 2:
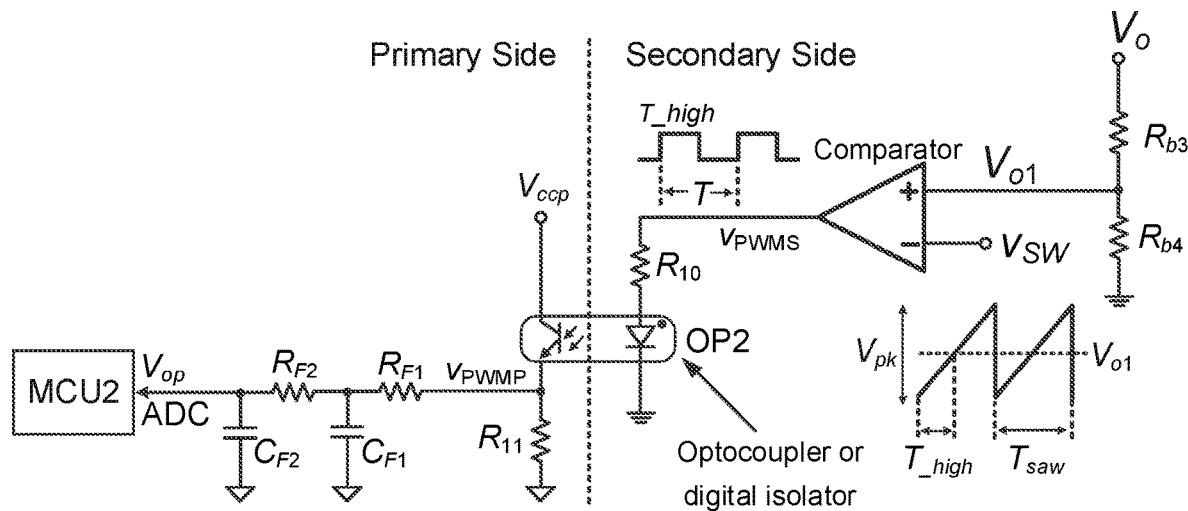
FIG. 2 is a schematic diagram of an output voltage Vo sensing circuit, according to one embodiment.

FIG. 2 is a circuit diagram of a sensing and control circuit for an isolated converter with a primary side controller, according to one embodiment. The primary side controller may be, e.g., a digital signal controller (DSC), a digital controller such as a microcontroller unit (MCU), a field programmable gate array (FPGA), etc. An example of a suitable controller is DSPIC33CK128MP205, available from Microchip Technology Inc., Chandler, Arizona, USA.

Figure 5:
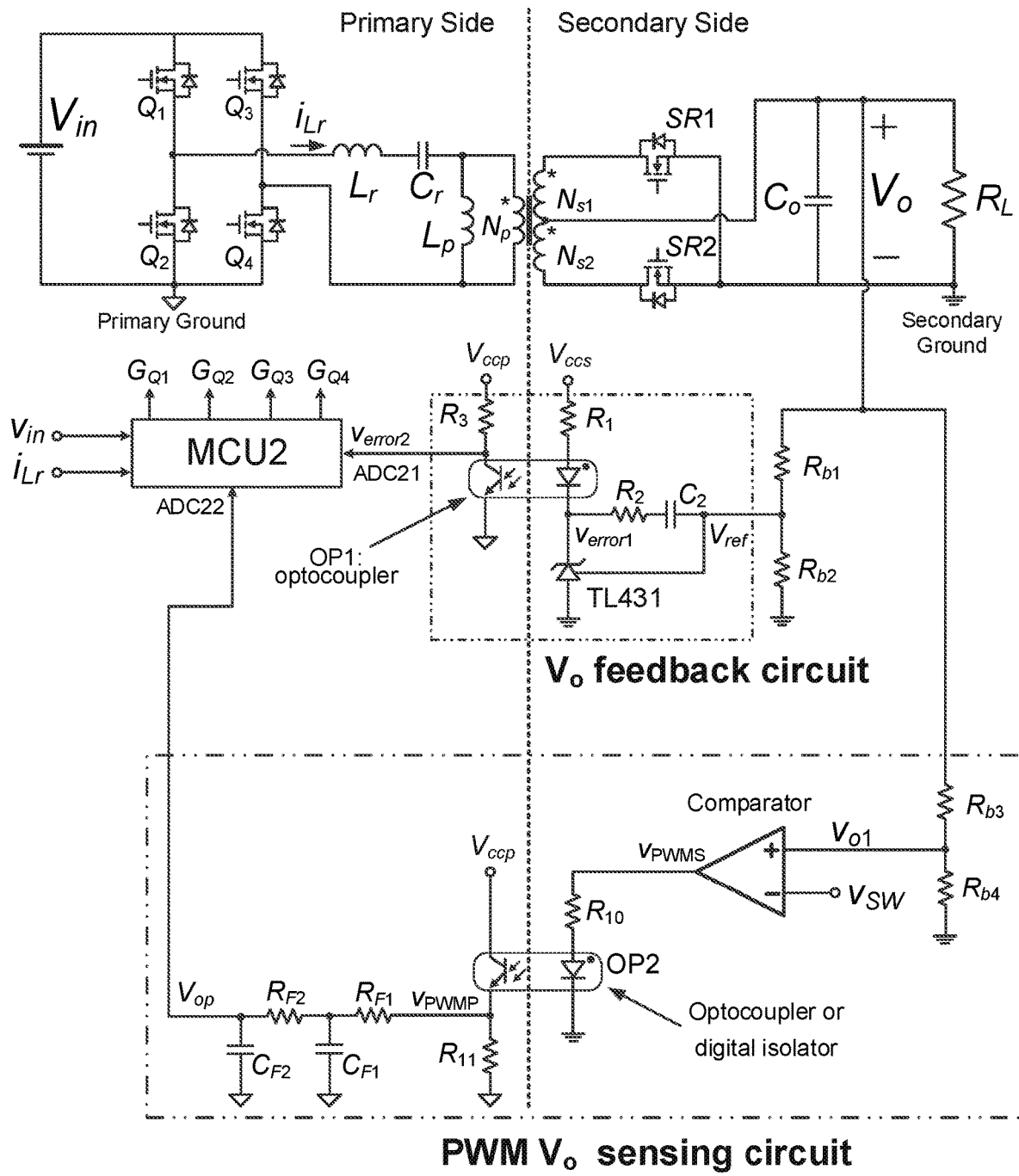
FIG. 5 is a schematic diagram of a PWM Vo sensing circuit having an error amplifier circuit for calibrating a steady state value, according to one embodiment.

For example, the embodiment of FIG. 2 may be used with an isolated DC-DC converter with full bridge LLC converter as the power stage, as shown in FIG. 5. The embodiment of FIG. 2 provides Vop as the input to a primary side controller, e.g., the ADC input to MCU2, as shown in FIG. 2. The Vop may be used by the primary side controller to regulate the output voltage Vo, for example, to achieve output over voltage protection (OVP) and output under voltage protection (UVP), and/or, for example, to detect the change rate of the output voltage, based on which to expedite a dynamic response of the power supply closed loop system. The embodiment of FIG. 2 is based on a pulse width modulation (PWM) approach.

PWM Vo Sensing

Figure 4:
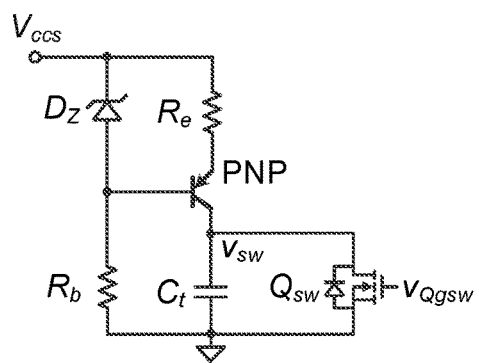
FIG. 4 is a schematic diagram that may be used to generate a sawtooth waveform, according to the prior art.
Figure 4:
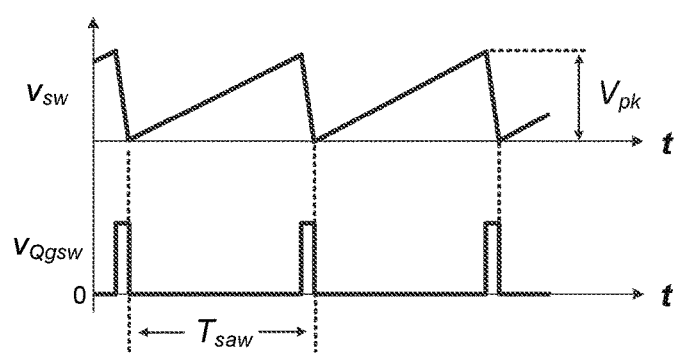

Referring to FIG. 2, the circuit includes a PWM Vo sensing circuit including resistor divider Rb3, Rb4 and a comparator with sawtooth waveform to convert the output voltage into a PWM signal, an optocoupler or digital isolator OP2 to transfer the PWM signal across the isolation barrier, and a primary side filter to recover the PWM information. The output voltage Vo is reduced by the resistor divider Rb3, Rb4 to produce Vo1. The comparator compares Vo1 with the sawtooth voltage Vsw at frequency Fsaw and period Tsaw=1/Fsaw. An example of a circuit that may be used to generate Fsaw is shown in FIG. 4. The output of the comparator is a logic signal with a logic high time interval of T_high, as defined by following equation:

$$T\_high = Vo1/Vpk * Tsaw \quad (4)$$

In the above equation, Vpk is the peak voltage of the sawtooth signal. The minimum value of the sawtooth signal is zero.

The duty cycle D of the comparator output signal may be defined as $$D = T\_high/Tsaw, \text{ then } D = Vo1/Vpk \quad (5)$$

since Tsaw and Vpk are fixed values. Therefore, the time interval T_high is directly proportional Vo1, which is proportional to Vo. Equivalently, the value D is directly proportional to Vo1. By retrieving the value of D or T_high, the output voltage value Vo can be measured.

Figure 3:
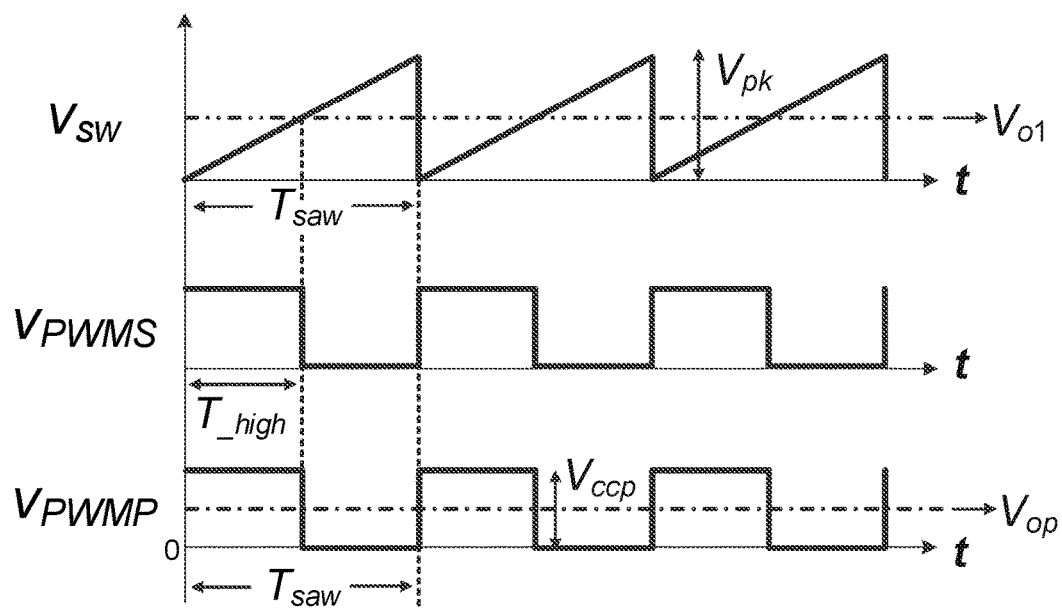
FIG. 3 shows plots of typical waveforms of the output voltage sensing circuit shown in FIG. 2.

The output voltage of the comparator ($V_{PWMS}$), which may be referred to as a logic signal, drives the optocoupler or a digital isolator OP2. The optocoupler or digital isolator transfers the logic signal from the secondary side to primary side of the isolated converter with electrical isolation. $V_{PWMP}$ (the output of the optocoupler or digital isolator, OP2) will have same shape as $V_{PWMS}$, as shown in FIG. 3, which shows key waveforms of the embodiment of FIG. 2. It is noted that the peak value of $V_{PWMP}$ is Vccp, which is the supply voltage applied to the primary side of the optocoupler or digital isolator OP2.

In this description, the terms "optocoupler" and "digital isolator" are used interchangeably and have the same meaning (that is, they perform effectively equivalent function), unless otherwise indicated. In the drawings, the symbol for an optocoupler is used for both an optocoupler implementation and for a digital isolator implementation. For an optocoupler the signal is transferred from the diode side (i.e., input) to the BJT side (i.e., output). For example, in the case of FIG. 2, the signal is transferred from right side to left side of the optocoupler. A digital isolator may be provided as an integrated circuit (IC) and does not use optical components to transfer the signal across the isolation barrier, and typically has a faster response time than an optocoupler.

In the embodiment of FIG. 2, a low pass RC filter implemented with RF1, CF1 and RF2, CF2 is used to filter out the frequency component of Fsaw and retrieve the average value of $V_{PWMP}$. The average value is Vop, which may be expressed as:

$$Vop=D*Vccp=Vo1*Vccp/Vpk=Vo*Rb4/(Rb3+Rb4)*Vccp/Vpk \quad (6)$$

$$\text{Or } Vop=\text{Gain\_Vo\_PWM}*Vo \quad (6.1)$$

$$\text{And Gain\_Vo\_PWM}=Rb4/(Rb3+Rb4)*Vccp/Vpk \quad (6.2)$$

where Gain_Vo_PWM is the equivalent gain of the PWM Vo sensing. Therefore, Vop is directly proportional to the output voltage Vo. The primary side digital controller MCU2 senses Vop by an Analog to Digital Converter (ADC). With this embodiment, the value of the output voltage Vo is transferred from the secondary side to the primary side of the isolated converter.

In practical implementations, component tolerances and non-ideal operation of an electronic circuit will introduce errors in the above analysis. For example, due to component tolerances, the peak value of the sawtooth signal (Vpk) may vary from design parameters. It can be observed from equation (6) that if Vpk changes by 5%, Vop will also change by about 5%. Therefore, the tolerance of Vop could be high, such as 5% to 20% in a practical implementation.

Assuming that for a given output voltage value, such as Vo=30V, the accurately sensed Vop is 3V (Vop=3V) without consideration of component tolerance. The gain of the PWM Vo sensing circuit is 0.1, Gain_Vo_PWM=Vop/Vo=0.1. If tolerance of 5% is considered, Vop may change from 3V to 3V+/−5%=2.85V to 3.15V. If tolerance of 10% is considered, Vop may change from 3V to 3V+/−10%=2.7V to 3.3V. This means that when the actual Vo is 30V, the sensed Vop may be between 2.7V to 3.3V.

It is noted that in most applications, Vo sensing tolerance of less than 3% is desired and less than 5% is required. Therefore, considering the tolerance of the conversion circuit, such as the Vpk value of the sawtooth signal, the voltage Vop at the primary side obtained by the PWM Vo sensing circuit might not have high enough accuracy to tightly regulate the output voltage Vo.

Therefore, according to another embodiment, the accuracy of the PWM Vo sensing circuit may be significantly improved by automatically calibrating its steady state operating point with the output voltage feedback loop using an error amplifier. For example, an error amplifier may be implemented together with an analog optocoupler (OP1), as shown in FIG. 5. A suitable device is a three-terminal adjustable shunt regulator with a voltage reference and internal error amplifier, such as TL431 available from Texas Instruments Inc. (Dallas, TX, USA), although other devices may also be used.

As shown in FIG. 5, the error amplifier and feedback compensation network (R2 and C2) are used to regulate the output voltage Vo to its steady state value. The error voltage Verror1 is transferred from the secondary side to the primary side of the converter as Verror2 using the analog optocoupler (OP1). Using the error amplifier circuit, the tolerance of the output voltage regulation is determined by the tolerance of the Vref of the error amplifier, and the tolerances of Rb1 and Rb2. In the case of TL431, the tolerance of Vref is less than 1%. The tolerances of Rb1 and Rb2 may be between 0.1% to 1%. Therefore, the tolerance of Vo regulation may be limited to less than 3%, such as 1% in most cases.

Under steady state operation, the output voltage Vo is stable and the error voltage Verror2 is also stable. Verror2 is sampled by an ADC, in this case ADC21 input of the MCU2. At the same time, the PWM Vo sensing circuit also produces Vop that is sampled by another ADC, ADC22 input of MCU2.

Importantly, since at steady state operation, the output voltage Vo is maintained at a steady state value (Vo_ss), the actual sensed value of Vop (Vop_act) at steady state operation is directly proportional to the steady state value of Vo_ss, which is a known value. Therefore, the actual gain of the PWM Vo sensing circuit may be calculated as:

$$\text{Gain\_Vo\_PWM\_act}=Vop\_act/Vo\_ss \quad (7)$$

where Vop_act is the actual measured voltage at the ADC22 input when the circuit operates at steady state. The actual gain value of the PWM Vo sensing circuit at steady state operation can be calculated using the above equation. Therefore, by using an error amplifier such as in the embodiment of FIG. 5, the effect of tolerances of the PWM Vo sensing circuit can be substantially removed.

This embodiment is further described by way of the following non-limiting example, with reference to FIG. 5.

Assume (A) the ideal gain of the PWM Vo sensing circuit is 0.09; (B) the actual measured Vop_act at steady state is 3V; and (C) the steady state output voltage is Vo_ss=30V.

Then the actual gain of the PWM Vo sensing circuit at steady state is Gain_Vo_PWM_act=3V/30=0.1. This steady state gain value is used by MCU2 to calibrate the sensed Vop to determine the actual output voltage. For example, if the measured VopA=3.5V, the actual output voltage will be calculated using the steady state gain value as VoA=3.5V/0.1=35V. It is noted that without the calibration, VopA of 3.5V will be "interpreted" by MCU2 using the ideal gain value instead, as VoA_interpreted=3.5/0.09=38.89V, while the actual output voltage is 35V. Similarly, using the calibration method, if the measured Vop is VopB=2.8V, the actual output voltage VoB will be calculated using the steady state gain value as VoB=2.8V/0.1=28V. It is observed that the calibration method as described above significantly increases the Vo sensing accuracy.

Thus, the output voltage Vo at the secondary side can be measured (or calculated) accurately from the primary side by:

$$Vo=Vop/\text{Gain\_Vo\_PWM\_act} \quad (8)$$

For example, if at steady state, the output voltage is Vo=30V and the voltage measured by ADC22 of MCU2 is Vop_act=3V, the actual (steady state) gain is 3V/30V=0.1. Therefore, if the measured Vop is 2.5V, the actual output voltage, Vo, can be predicted accurately by MCU2 at the primary side as 25V (=2.5V/0.1). Similarly, if measured Vop is 3.5V, the actual output voltage Vo can be predicted as 35V (=3.5V/0.1). With the accurately measured output voltage, the primary side MCU2 can achieve accurate output over voltage protection and output under voltage protection. MCU2 can also perform additional calculations based on the actual output voltage to achieve better closed loop performance.

In some embodiments the calibration process may be performed continuously during operation of the power supply. The actual gain of the PWM Vo sensing circuit may be updated continuously. For example, immediately after the power supply turns on, the temperature may be at around 25° C. (room temperature). The peak value of the sawtooth signal is Vpk_25. If the power supply temperature rises to 100° C., the peak value of the sawtooth signal may change to Vpk_100, which is different from Vpk_25. The actual gain of the PWM Vo sensing circuit changes from Gain_25 to Gain_100. With the calibration loop including an error amplifier and analog optocoupler, the actual gain of the PWM Vo sensing circuit is updated and the actual output voltage Vo can be measured accurately by Vop: Vo=Vop/Gain_Vo_PWM_act.

If the LLC converter used is a single stage AC to DC rectifier with Power Factor Correction (PFC), the output voltage Vo will contain a steady state DC voltage superimposed by a double line frequency AC ripple voltage (100 Hz for Europe and Asia and 120 Hz for North America). For example, the DC value of Vo may be Vo_DC=30V. The double line frequency ripple may be Vo_rip=5V (peak to peak). Assuming gain of 0.1, the measured Vop will also contain a DC value of Vop_DC=3V and double line frequency AC ripple of Vop_rip=0.5V (peak to peak). In this case, the steady state value, or DC value of Vop, Vop_DC, may be used to calibrate the actual gain of the PWM Vo sense circuit. Vop_DC may be calculated by MCU2 by taking the average of the sampled Vop voltage over the period of double line frequency (100 Hz or 120 Hz). The actual gain of the PWM Vo sensing circuit with PFC operation can be calculated as:

$$Gain\_Vo\_PWM\_act\_PFC = Vop\_DC/Vo\_DC \quad (8.1)$$

With the PWM Vo sensing circuit as shown in FIG. 2 together with the calibration method as shown in FIG. 5, the instantaneous output voltage can be sensed accurately, by the following equation:

$$Vo = Vop/Gain\_Vo\_PWM\_act\_PFC \quad (8.2)$$

With accurate output voltage sensing provided by this embodiment, the ripple voltage can be sensed accurately and may be used to improve the performance of the single stage AC to DC rectifier.

It is also noted that two signals related to the output voltage are sensed at the primary side digital controller, MCU2. One is the output voltage error signal that is produced by the error amplifier. This error signal is not directly proportional to the output voltage. The other is a voltage signal that is directly proportional to the output voltage.

With the PWM Vo sensing circuit as shown in FIG. 5, a low pass filter consisting of RF1, CF1 and RF2, CF2 is used to retrieve the average value of the $V_{PWMP}$. It is noted that this low pass filter will introduce a small time delay of the Vo sensing. If Vo has a very fast change, the Vop cannot change instantly. For example, if the sawtooth frequency is Fsaw=100 KHz, RF1=200K), CF1=150 pF, RF2=150 KΩ, CF2=100 pF, the delay time is estimated as around 200 us. This means that if Vo changes quickly from 30V to 33V, it will take Vop about 200 us to change from 3V to 3.3V. This delay should be considered in the design. In some applications, this delay is not desired, or even not allowed.

Figure 6:
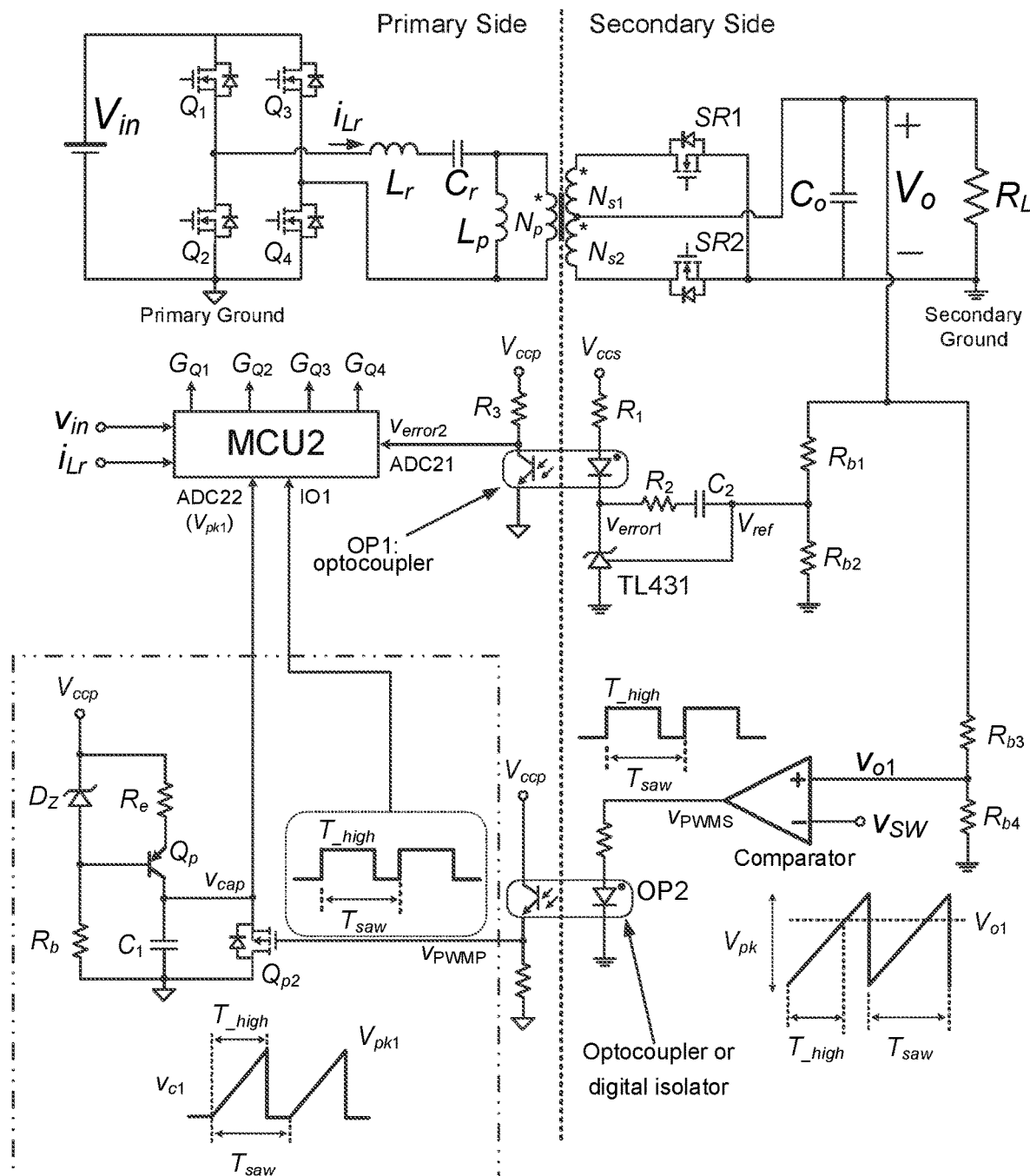
FIG. 6 is a schematic diagram of a PWM Vo sensing circuit having an error amplifier circuit for calibrating a steady state value, according to another embodiment.

Such delay may be substantially avoided by the embodiment of FIG. 6, which shows a fast PWM Vo sensing circuit with very small delay. At the secondary side, the output voltage Vo is converted into a PWM signal $V_{PWMS}$ using a comparator and sawtooth wave Vsw. T_high is the logic high time interval of that PWM signal and is proportional to the output voltage Vo. The PWM signal is transferred to the primary side by an optocoupler or digital isolator OP2 as $V_{PWMP}$. At the primary side, $V_{PWMP}$ is input to a fast T_high value retrieval circuit having a constant current charging circuit and timed sample circuit, as shown in the dotted box in FIG. 6.

$V_{PWMP}$ is used to control the on and off operation of the P-channel MOSFET switch (QP2) of the fast PWM Vo sensing circuit. When $V_{PWMP}$ is at logic high level, QP2 is off and the capacitor C1 is charged by constant current generated by Qp, Dz (Zener diode), Re, and Rb. C1 voltage rises linearly. At the end of T_high, the voltage at C1 is Vpk1, as calculated below by equation (9). The falling edge of the $V_{PWMP}$ is sent to MCU2 to instruct MCU2 to sample the C1 voltage at the falling edge time instant. Therefore, Vpk1 is sensed by MCU2. When $V_{PWMP}$ becomes low, QP2 is turned on and the capacitor C1 is discharged to zero. The peak value of C1 (Vpk1) is calculated from the following equation:

$$Vop = Vpk1 = IC1*T\_high = T\_high*(Vz-0.7)/Re/C1 \quad (9)$$

where Vz is the Zener diode voltage of Dz. Therefore, the peak value of C1, Vpk1 (=Vop), is proportional to the logic high time duration (T_high) of the PWM signal. When Vo increases, T_high increases, and therefore, Vpk1 (=Vop) increases proportionally. The gain of the fast T_high value retrieval circuit as shown in FIG. 6 is calculated as:

$$Gain\_Vo\_PWM\_fast = Vpk1/Vo = Rb4/(Rb3+Rb4)*Tsaw/Vpk*(Vz-0.7)/Re/C1 \quad (10)$$

With the fast T_high value retrieval circuit, no low pass filter is used. The output voltage value is sensed for every Tsaw period, or at the sawtooth frequency, Fsaw. Since the Fsaw may be around 100 kHz to 200 kHz, the time delay for Vo sensing is, therefore, around 5 us or 10 us. This is much shorter than the time delay of around 200 us needed by the PWM Vo retrieval circuit with low pass filter, as shown in FIG. 5.

As discussed above for the embodiment of FIG. 5, the accuracy of the embodiment of FIG. 6 may be about 5 to 10% due to component tolerances, which may not be accurate enough to regulate the DC value of the output voltage in some applications (e.g., <3% may be required). Therefore, a PWM Vo sensing circuit calibration method similar to that described above for the embodiment of FIG. 5 may be implemented in the embodiment of FIG. 6 using an error amplifier and a T_high sensing circuit (as shown in FIG. 6) wherein the steady state gain=Vpk1_ss/Vo_ss and the actual gain is Vpk1/Vo_ss. The steady-state value of the output voltage Vo is regulated by the error amplifier, and the PWM Vo sensing circuit provides a voltage signal that is directly proportional to the output voltage. This provides additional information for the digital control loop. The calibration process may be carried out continuously and the actual gain of the fast PWM Vo sensing circuit may be updated continuously.

Accurate PWM Vo Sensing

Figure 7:
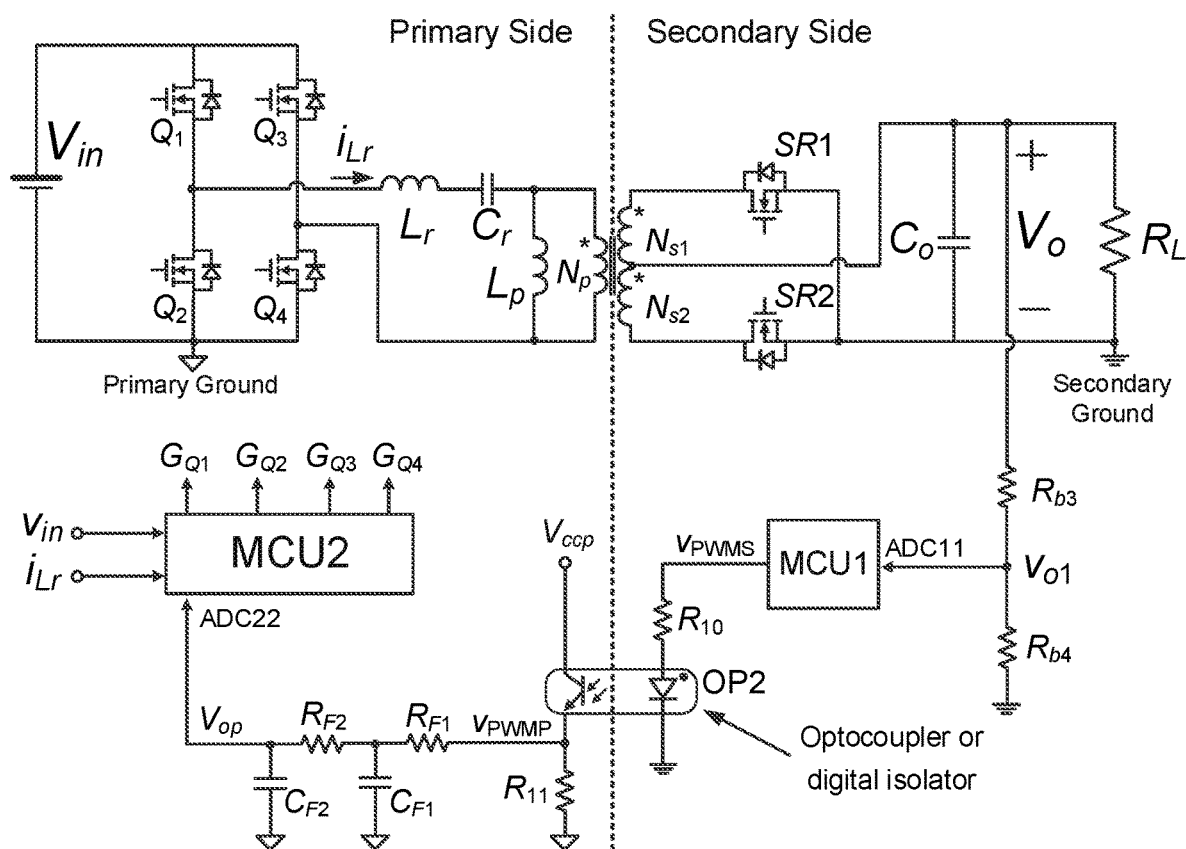
FIG. 7 is a schematic diagram of an output voltage sensing circuit using a digital controller at the primary side and another digital controller at the secondary side, according to one embodiment.

Another embodiment, shown in FIG. 7, provides an accurate PWM Vo sensing circuit that achieves accuracy of 3% or better. In this circuit, another digital controller MCU1 is used at the secondary side. The output voltage Vo is sensed by the ADC input ADC11 of MCU1 and is converted into a digital value. MCU1 generates a PWM signal ($V_{PWMS}$) based on the sensed output voltage Vo1. Since the ADC of MCU1 is very accurate (i.e., it may have a high resolution such as 12 or 16 bits), the duty cycle of $V_{PWMS}$ is accurately proportional to Vo. $V_{PWMS}$ drives the optocoupler or digital isolator (OP2, as shown in FIG. 7), and the PWM signal is transferred to the primary side as $V_{PWMP}$. Since the delay time of a digital isolator is very small, $V_{PWMP}$ will have substantially the same duty cycle as $V_{PWMS}$. Therefore, Vop may be calculated as:

$$Vop=D*Vccp \quad (11)$$

If Vccp is well regulated (such as with accuracy of about 1%), the value at Vop (after the low pass filter) is proportional to the duty cycle of the PWM signal $V_{PWMS}$. The accuracy of Vop will be very high, such as better than 3% to 5%.

Since the ADC of MCU1 is very accurate, Vop at the primary side will be accurately proportional to the output voltage Vo at the secondary side. An improvement in this implementation is that the conversion from Vo to a PWM signal is achieved by a digital controller that implements an ADC and PWM module, such as, for example, an MCU.

According to this embodiment, since the output voltage Vo at the secondary side is sensed and accurately converted to a PWM signal at the secondary side, and accurately transferred at the primary side as Vop, a calibration circuit such as the embodiment described above having an error amplifier and related circuit, including a second optocoupler or digital isolator, is not needed. With this embodiment, only one optocoupler or digital isolator (OP2) is needed. Vop is used for both steady state output voltage regulation and for dynamic regulation, as well as output over voltage protection, output under voltage protection, etc.

Because of the presence of the low pass filter after the optocoupler or digital isolator OP2, the response time of the PWM Vo sensing circuit shown in FIG. 7 may be slow due to a time delay between the change of output voltage Vo at the secondary side and the change of Vop at the primary side. For example, if the frequency of $V_{PWMS}$ is about 100 kHz, the delay time will be around 200 us.

Figure 8:
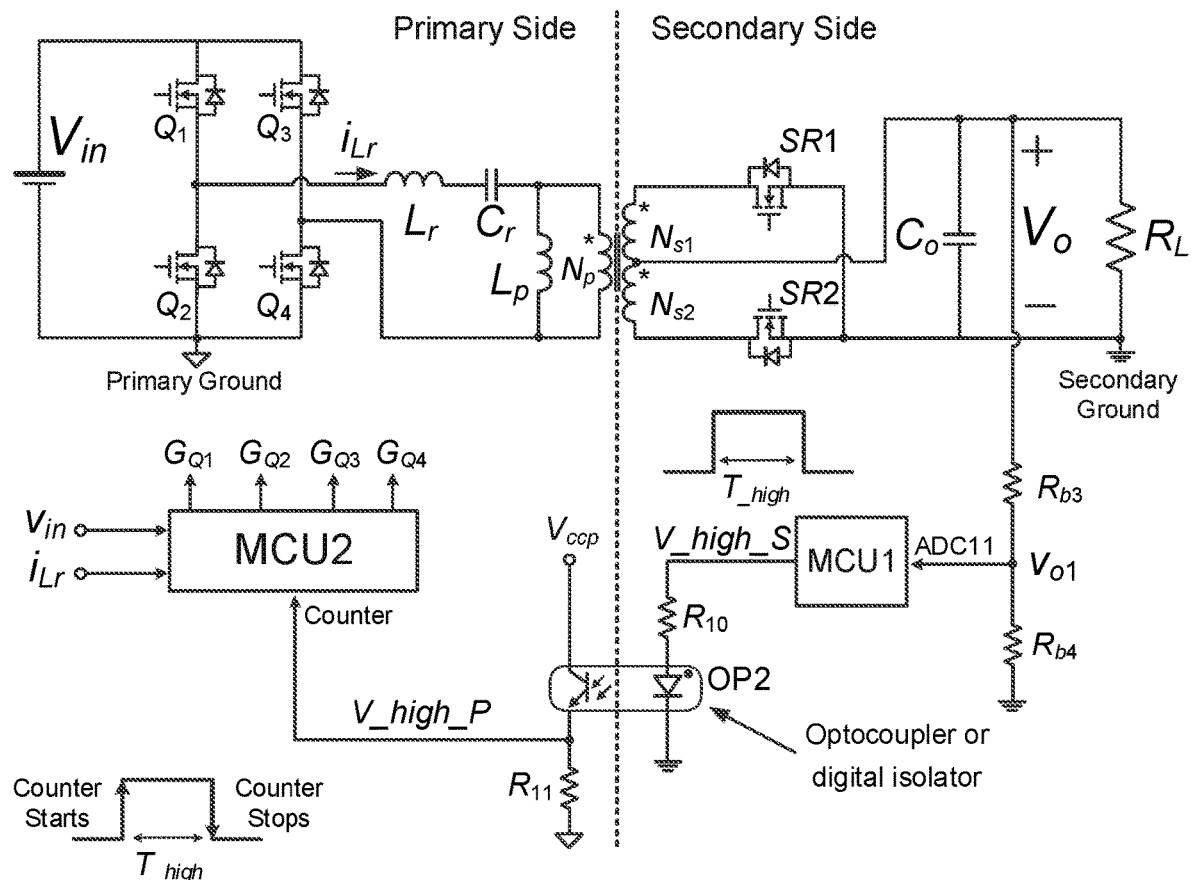
FIG. 8 is a schematic diagram of an output voltage sensing circuit using a digital controller at the primary side and another digital controller at the secondary side, according to another embodiment.

One way to address the time delay of the embodiment of FIG. 7 is shown in the embodiment of FIG. 8. A speed improvement may be achieved by using a counter function of the digital controller (e.g., MCU2) to measure the logic high time interval (T_high) of the V_high_P signal from the optocoupler or digital isolator OP2, as shown in FIG. 8. In this embodiment, the output voltage sensed by MCU1 at the secondary side is converted into a logic high time interval, T_high, as represented by V_high_S in FIG. 8. This T_high time interval information is transferred to the primary side by OP2 into V_high_P. The logic high time interval of V_high_P is the same as the logic high time interval of V_high_S (T_high). The counter in MCU2 counts the time duration of the logic high time (the time interval between the rising edge and falling edge of V_high_P). Therefore, the measured value of T_high by MCU2 is proportional to the output voltage Vo.

Figure 9A:
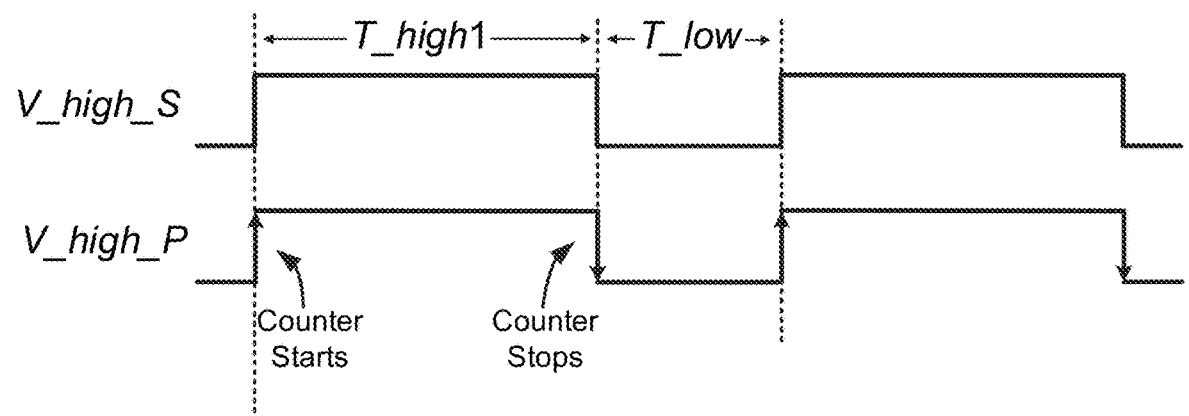
FIGS. 9A and 9B are plots showing typical waveforms to detect a T_high time interval for high and low output voltages, respectively, for the embodiment of FIG. 8.
Figure 9B:
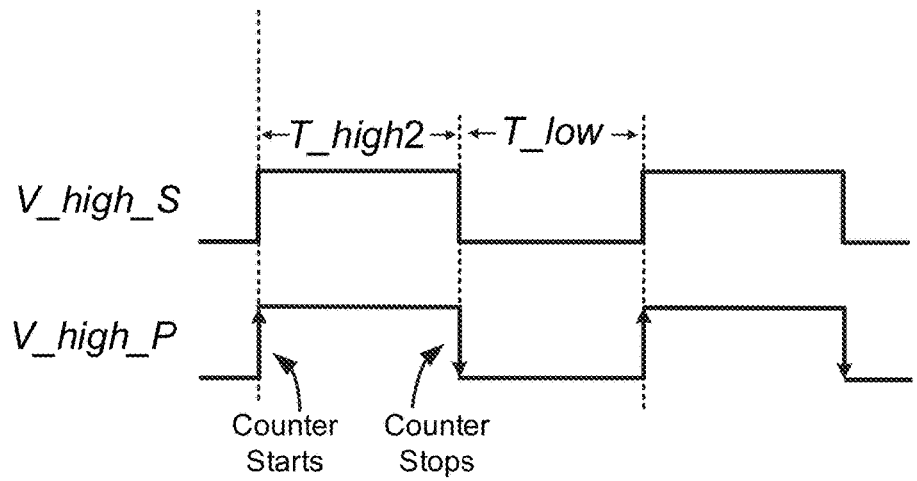

FIGS. 9A and 9B show typical waveforms to demonstrate operation of the embodiment of FIG. 8. Referring to FIG. 9A, is assumed that when Vo is at steady state value, such as 30V, MCU1 will produce a logic high time of 10 us, T_high1=10 us. This signal (V_high_S) is transferred to the primary side by the optocoupler or digital isolator as V_high_P. The T_high value is same for V_high_S and V_high_P. The rising edge of V_high_P is used to start a counter in MCU2 and the falling edge of V_high_P is used to stop the counter in MCU2. Therefore, the time interval T_high can be accurately measured by MCU2. In a typical MCU, the counter period may be about 20 ns. Therefore, the accuracy of the T_high may be 20 ns/10 us=20 ns/10,000 ns=0.2%. This provides accurate Vo sensing for all applications of an isolated converter. MCU1 adds a logic low time interval (T_low) between two logic high signals (T_high). This logic low time interval is needed to separate two samples of output voltage. It is noted that this logic low time interval, T_low, is only needed to be long enough to distinguish two logic high intervals. For a general purpose MCU, T_low of 1 us will be sufficient to distinguish two high signals. For example, if T_high=10 us and T_low=2 us, the update rate of Vo may be every 12 us. Thus, every 12 us a new Vo value will be obtained at the primary side.

FIG. 9B shows typical waveforms when the output voltage is Vo=15V (about half of the steady state value). With the above example, the T_high is 5 us and T_low is still 2 us. Then, every 7 us, the Vo measurement can be updated at the primary side. This asynchronous information transfer is desirable to reduce the time delay of the output voltage sensing and transfer. It is noted that the waveforms of FIGS. 9A and 9B are at different frequencies.

Figure 9C:
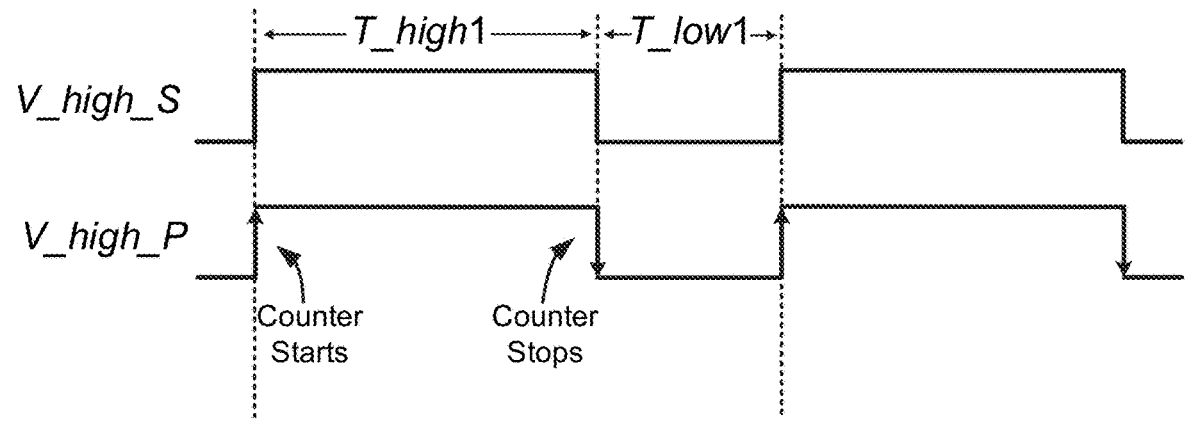
FIGS. 9C and 9D are plots showing typical waveforms to detect a T_high time interval for high and low output voltages, respectively, according to another embodiment.
Figure 9D:
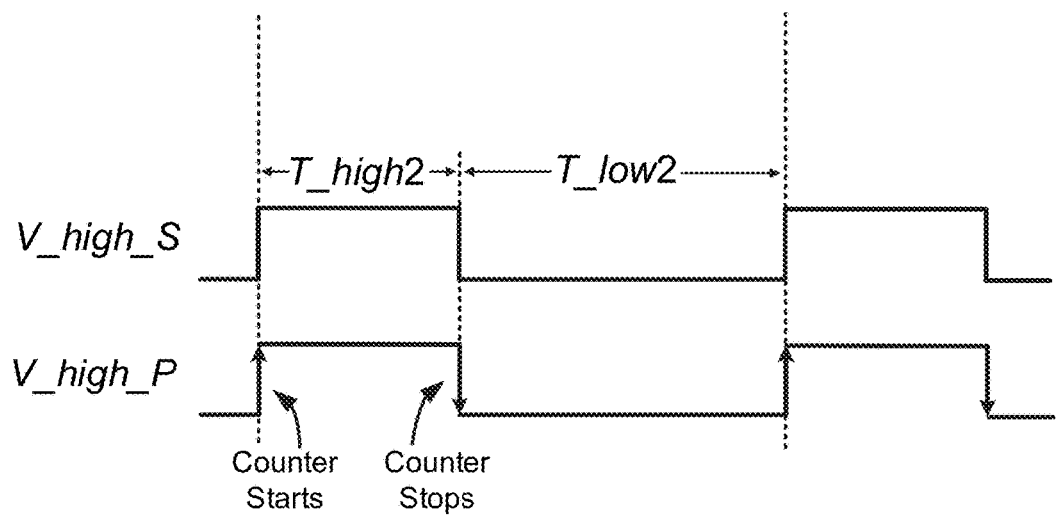

In another embodiment, waveforms for T_high and T_low logic levels are produced at the same frequency, as shown for two different V_high voltages in the example of FIGS. 9C and 9D. This may be preferred in some applications as the resulting longer time interval between interrupts (counts), relative to the embodiment of FIGS. 9A and 9B, requires less system resources.

Figure 10:
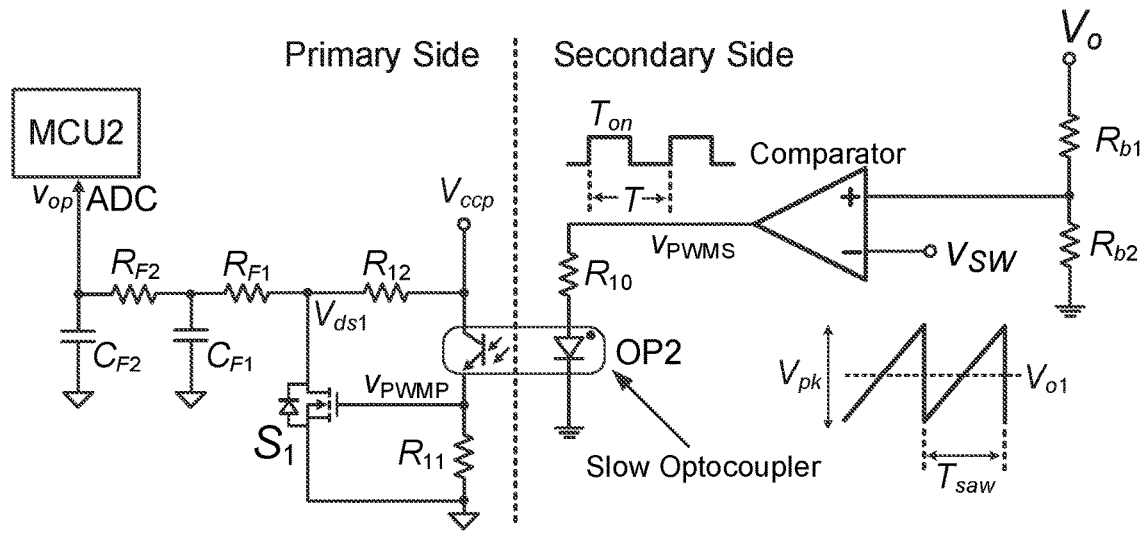
FIG. 10 is a schematic diagram of a Vo sensing circuit, according to one embodiment.

In the above embodiments, it is assumed that a high speed optocoupler or a digital isolator is used to transfer signals from the secondary side to the primary side. However, due to costs, in actual implementations a regular optocoupler or a slow optocoupler may be used as they are less expensive than high speed optocouplers. With a slow optocoupler, the rising and falling edges of the PWM signal are long, which reduces the accuracy of Vop. To address this issue, as described herein, Vo sensing circuits using a regular or slow optocoupler may be implemented with a small-signal MOSFET after the optocoupler. For example, as shown in FIG. 10, the gate of MOSFET $S_1$ may be connected to the optocoupler OP2 output $V_{PWMP}$ and the drain connected to the supply voltage Vccp via R12. The drain voltage of MOSFET $S_1$ (Vds1) will have a sharp rise and falling edge. Therefore, the average voltage of Vop will follow the duty cycle of the VPWMS very closely.

Figure 11:
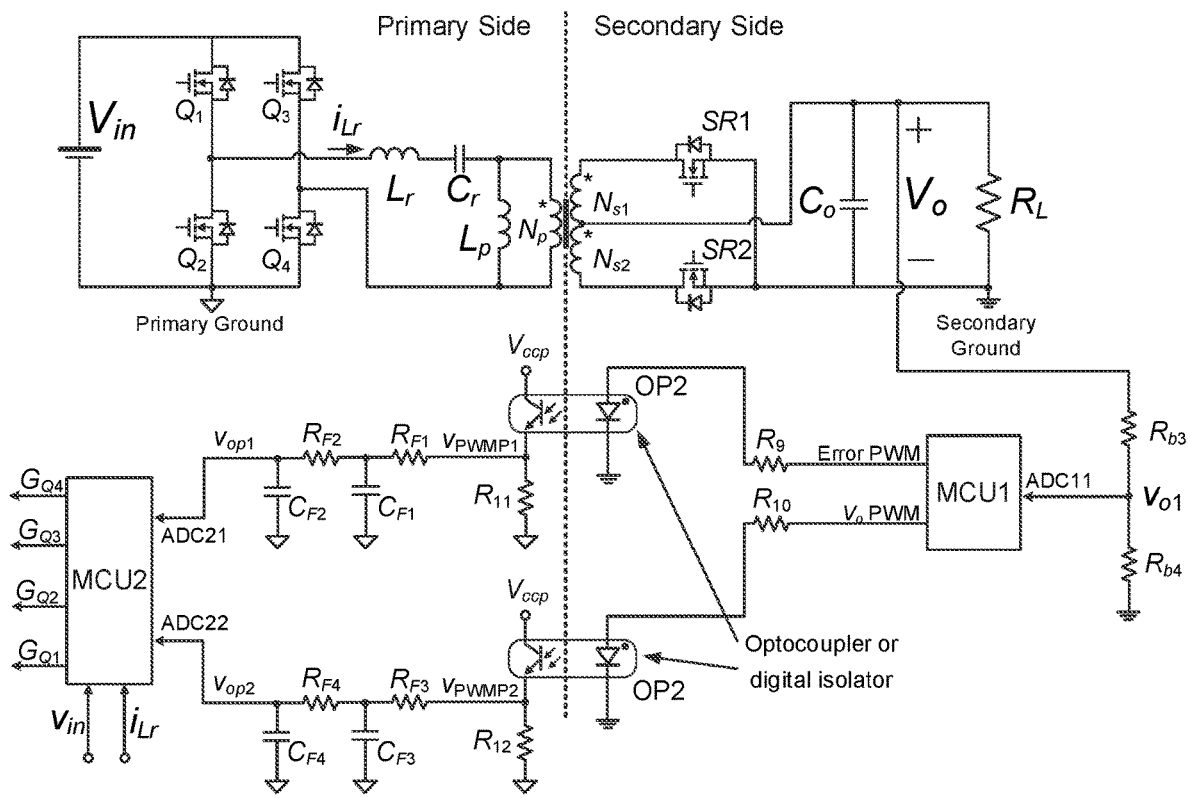
FIG. 11 is a schematic diagram of a Vo sensing circuit, according to one embodiment.

The embodiment of FIG. 11 is a digital implementation of the circuit shown in FIG. 5. Two MCUs are used, MCU1 at the secondary side and MCU2 at the primary side. The secondary side MCU generates two PWM signals, Error PWM and Vo PWM. The duty cycle of the first PWM signal (Error PWM) is proportional to the output of the error amplifier Verror1 as shown in FIG. 5, which is an analog signal. In FIG. 11, the error voltage Verror1 is calculated by the MCU1 as an internal value and is output as a digital signal Error PWM. In the embodiment of FIG. 11, both isolators (OP2) may be implemented with optocouplers or digital isolators, since both signals are PWM signals.

The duty cycle of the second PWM signal (Vo PWM) is proportional to the actual value of Vo. Using the calibration method described above, the Error PWM signal may be used to calibrate the Vo PWM signal to remove the possible error introduced because of the inherent delay time of the digital isolator or optocoupler and to improve the accuracy of the PWM Vo sensing.

Similarly, the T_high time detection method as described with respect to the embodiment of FIG. 8 may also be used to detect the pulse width of the Vo PWM signal and therefore to detect the actual output voltage Vo. The details would be apparent to one skilled in the art based on the embodiments described above.

The contents of all cited documents are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered exemplary and the invention is not to be limited thereby.

The invention claimed is:

1. A control circuit for an isolated power converter, comprising:
a first secondary side circuit that senses a secondary side output voltage of the isolated power converter and produces a pulse width modulation (PWM) signal having a logic high time (T_high) interval that is proportional to a value of the secondary side output voltage;
a first isolator that transfers the PWM signal across an isolation barrier to a primary side of the isolated power converter; and
a first primary side circuit including a processor that receives the PWM signal from the first isolator;
wherein the first primary side circuit comprises a sampling circuit including a capacitor that is charged and discharged according to the T_high interval of the PWM signal and a switch that shapes the PWM signal received from the first isolator by reducing a falling time and rising time of the PWM signal;
wherein the first primary side circuit samples a voltage across the capacitor at a sampling time set by a period of the PWM signal; and
wherein the sampled voltage across the capacitor is used by the processor to determine a gain of the sampling circuit and to control primary side power switching devices of the isolated power converter to regulate the secondary side output voltage at a selected value.

2. The control circuit of claim 1, wherein the first secondary side circuit comprises a comparator that produces the PWM signal.

3. The control circuit of claim 1, wherein the first secondary side circuit comprises a secondary side microcontroller that produces the PWM signal.

4. The control circuit of claim 1, wherein the control circuit further includes a feedback circuit comprising:
a second secondary side circuit that senses the secondary side output voltage of the isolated power converter and uses the sensed secondary side output voltage and a reference voltage to produce an error voltage;
a second isolator that transfers the error voltage across the isolation barrier to the primary side of the isolated power converter;
wherein the first primary side circuit determines a steady state output voltage using the reference voltage and calculates a steady state ga in using the steady state output voltage, and uses the steady state gain to calibrate an actual gain of the first secondary side circuit to determine an actual secondary side output voltage;
wherein the first primary side circuit controls the primary side power switching devices of the isolated power converter to regulate the secondary side output voltage at the selected value.

5. The control circuit of claim 4, wherein the second secondary side circuit comprises an error amplifier that produces the error voltage.

6. The control circuit of claim 1, wherein the first primary side circuit uses a duration of the T_high interval of the PWM signal to generate a voltage having a magnitude that is proportional to the value of the secondary side output voltage, measures the magnitude of the generated voltage, and uses the measured magnitude of the generated voltage to determine the value of the secondary side output voltage.

7. A method for controlling a n isolated power converter, comprising:
sensing a secondary side output voltage of the isolated power converter using a first secondary side circuit that produces a pulse width modulation (PWM) signal having a logic high time (T_high) interval that is proportional to a value of the secondary side output voltage;
using a first isolator to transfer the PWM signal across an isolation barrier to a primary side of the isolated power converter; and
using a first primary side circuit to receive the PWM signal from the first isolator;
wherein the first primary side circuit comprises a sampling circuit including a capacitor that is charged and discharged according to the Thigh interval of the PWM signal, and a switch that shapes the PWM signal received from the first isolator by reducing a falling time and rising time of the PWM signal;
wherein the first primary side circuit samples a voltage across the capacitor at a sampling time set by a period of the PWM signal; and
wherein the sampled voltage across the capacitor is used by the first primary side circuit to determine a gain of the sampling circuit and to control primary side power switching devices of the isolated power converter to regulate the secondary side output voltage at a selected value.

8. The method of claim 7, wherein the first secondary side circuit comprises a comparator that produces the PWM signal.

9. The method of claim 7, wherein the first secondary side circuit comprises a secondary side microcontroller that produces the PWM signal.

10. The method of claim 7, wherein the method further comprises:
using a second secondary side circuit that senses the secondary side output voltage of the isolated power converter and uses the sensed secondary side output voltage and a reference voltage to produce an error voltage;
using a second isolator to transfer the error voltage across the isolation barrier to the primary side of the isolated power converter;

wherein the first primary side circuit determines a steady state output voltage using the reference voltage and calculates a steady state gain using the steady state output voltage, and uses the steady state gain to calibrate an actual gain of the first secondary side circuit to determine an actual secondary side output voltage;

wherein the first primary side circuit controls the primary side power switching devices of the isolated power converter to regulate the secondary side output voltage at the selected value.

11. The method of claim 10, wherein the second secondary side circuit comprises an error amplifier that produces the error voltage.

12. The method of claim 7, wherein the first primary side circuit uses a duration of the T_high interval of the PWM signal to generate a voltage having a magnitude that is proportional to the value of the secondary side output voltage, measures the magnitude of the generated voltage, and uses the measured magnitude of the generated voltage to determine the value of the secondary side output voltage.

13. An isolated power converter, comprising:
a first secondary side circuit that senses a secondary side output voltage of the isolated power converter and produces a pulse width modulation (PWM) signal having a logic high time (T_high) interval that is proportional to a value of the secondary side output voltage;

a first isolator that transfers the PWM signal across an isolation barrier to a primary side of the isolated power converter; and a first primary side circuit including a processor that receives the PWM signal from the first isolator;

wherein the first primary side circuit comprises a sampling circuit including a capacitor that is charged and discharged according to the T_high interval of the PWM signal and a switch that shapes the PWM signal received from the first isolator by reducing a falling time and rising time of the PWM signal;

wherein the first primary side circuit samples a voltage across the capacitor at a sampling time set by a period of the PWM signal; and wherein the sampled voltage across the capacitor is used by the processor to determine a gain of the sampling circuit and to control primary side power switching devices of the isolated power converter to regulate the secondary side output voltage at a selected value.

* * * * *